April 2, 1968     P. A. G. LEPELLETIER     3,375,909

BRAKING SYSTEM FOR AUTOMOBILE VEHICLES

Filed July 5, 1966     4 Sheets-Sheet 1

April 2, 1968  P. A. G. LEPELLETIER  3,375,909
BRAKING SYSTEM FOR AUTOMOBILE VEHICLES
Filed July 5, 1966  4 Sheets-Sheet 3
FIG.3
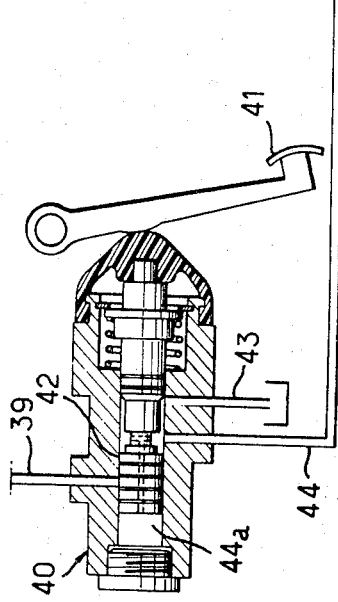
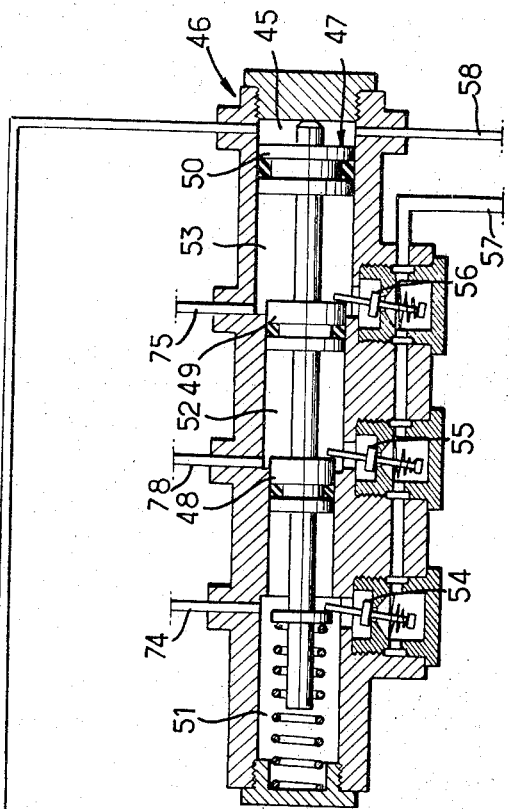
INVENTOR
PIERRE A. G. LEPELLETIER
BY Young & Thompson
ATTYS.

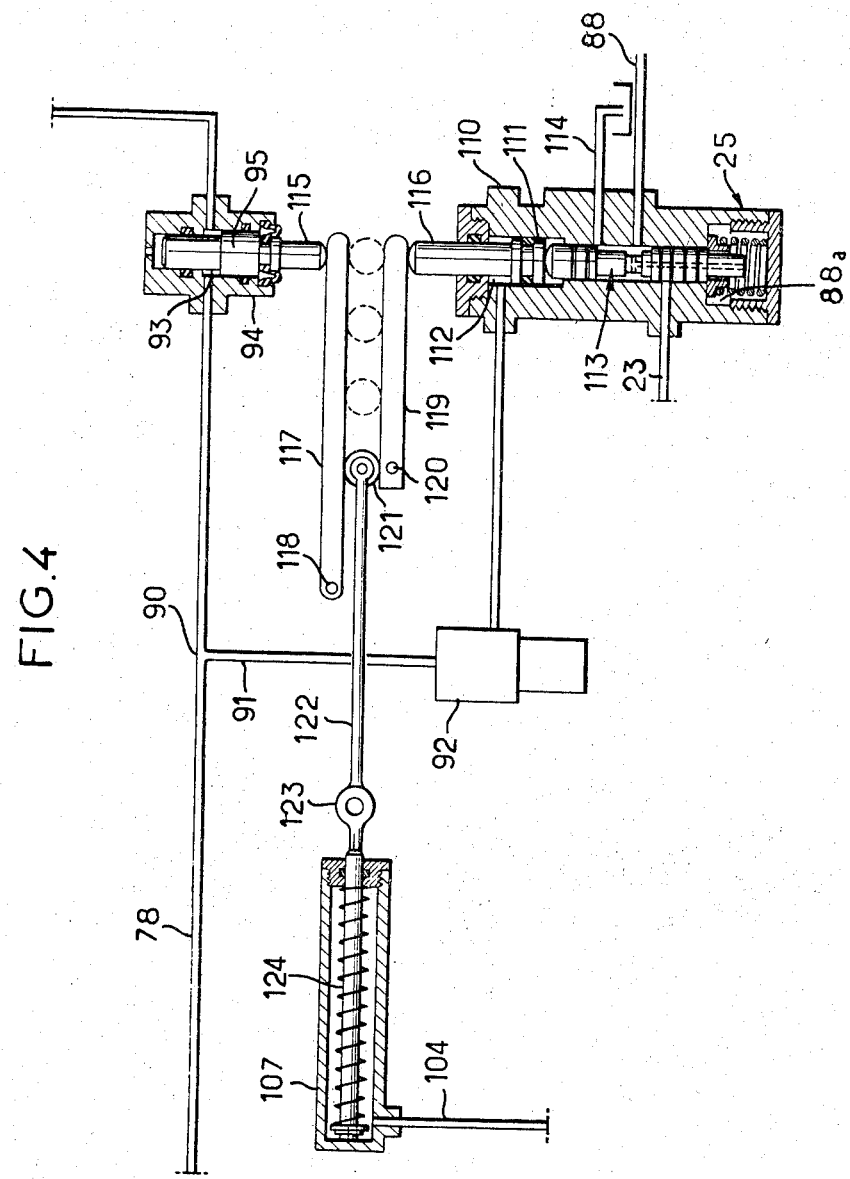

United States Patent Office 3,375,909
Patented Apr. 2, 1968

3,375,909
BRAKING SYSTEM FOR AUTOMOBILE
VEHICLES
Pierre Andre Georges Lepelletier, Chatou, France, assignor to Societe Anonyme Francaise du Ferodo, a corporation of France
Filed July 5, 1966, Ser. No. 562,883
Claims priority, application France, July 15, 1965, 24,689
7 Claims. (Cl. 188—195)

ABSTRACT OF THE DISCLOSURE

A disc brake for automotive vehicles has two brake shoes mounted on a common support member which has a limited tangential movement relative to the disc. The support member has primary and secondary brake cylinders and bears against a double piston which defines primary and secondary chambers that vary inversely in volume upon movement of the support member and that communicate with the respective primary and secondary brake cylinders. The secondary brake cylinders of both brakes on one axle communicate with each other. The secondary chambers thus communicate and therefore automatically balance the reactions of braking. A special load-responsive device applies the brakes with a force that varies as the load.

The present invention relates to brakes and braking installations, especially of automobile vehicles, and is more particularly directed amongst others, to disc brakes, load correctors, braking installations comprising either of these or both, and other applications.

One of the objects of the invention consists of improvements in disc brakes, which increase the effectiveness and improve the balancing of these brakes.

A disc brake according to the invention is particularly characterized in that is comprises a pair of shoes adapted to grip a disc and mounted on a member having a latitude of tangential movement, an actuating cylinder receiving an actuating pressure and acting on the said shoes so as to cause them to grip, the said shoe-carrier member co-operating in one direction with a fixed stop and in the other direction with a double piston which forms two chambers, one of these chambers, the so-called primary chamber, being coupled to the actuating cylinder, while the other so-called secondary chamber is coupled to a backing cylinder which assists the actuating cylinder by acting on the said shoes in order to cause them to grip.

The invention has also for its object braking installations comprising at least two disc brakes such as defined above, in which an intercommunication is provided between the backing cylinders. In these installations, according to the invention, equivalent, equal or proportional volumes of fluid are expelled by a triple-master cylinder simultaneously into the actuating cylinders of the two disc brakes and into the backing cylinders.

A further object of the invention consists of improvements in load correctors for the brakes of an automobile vehicle.

According to the invention, a load corrector for the brakes of an automobile vehicle is especially characterized in that it comprises means for supplying the brakes servo-controlled to the position of a piston which is subjected, on the one hand with a variable ratio as a function of the load on the vehicle, to a pressure which varies as a function of the degree of braking applied by the user, and on the other hand with a fixed ratio to a pressure derived from the said variable pressure by means of a pressure-reducing or pressure-limiting device.

According to another characteristic feature, the pressure variable as a function of the degree of braking applied by the user is permitted to exist in a conduit which passes through a chamber having a second piston, while a pair of pivoted arms receiving between them a roller, the position of which depends on the load of the vehicle, is interposed between the two pistons, a second conduit comprising a pressure-limiter being connected to the said conduit and acting on the first piston. The roller interposed between the two arms is preferably actuated by a cylinder associated with the suspension system of the vehicle.

The various improvements according to the invention may be adopted either separately or advantageously, in combination.

In particular, a further object of the invention consists of a braking installation of an automobile vehicle, comprising, for one axle, two disc brakes such as described above, and for another axle, two other brakes supplied by a load corrector such as described above, in which the conduit of the corrector which receives a pressure varying as a function of the degree of braking applied by the user, is connected to the backing cylinders of the two disc brakes.

The objects, characteristics and advantages of the invention will furthermore be brought out in the description which follows below of one form of construction chosen by way of example, reference being made to the accompanying drawings, in which:

FIG. 3 is a view in section of the pedal braking control and the triple-master cylinder;

FIG. 4 is a view of the braking corrector device for the rear wheels, acting in dependence on the load of the vehicle.

Figure 1:
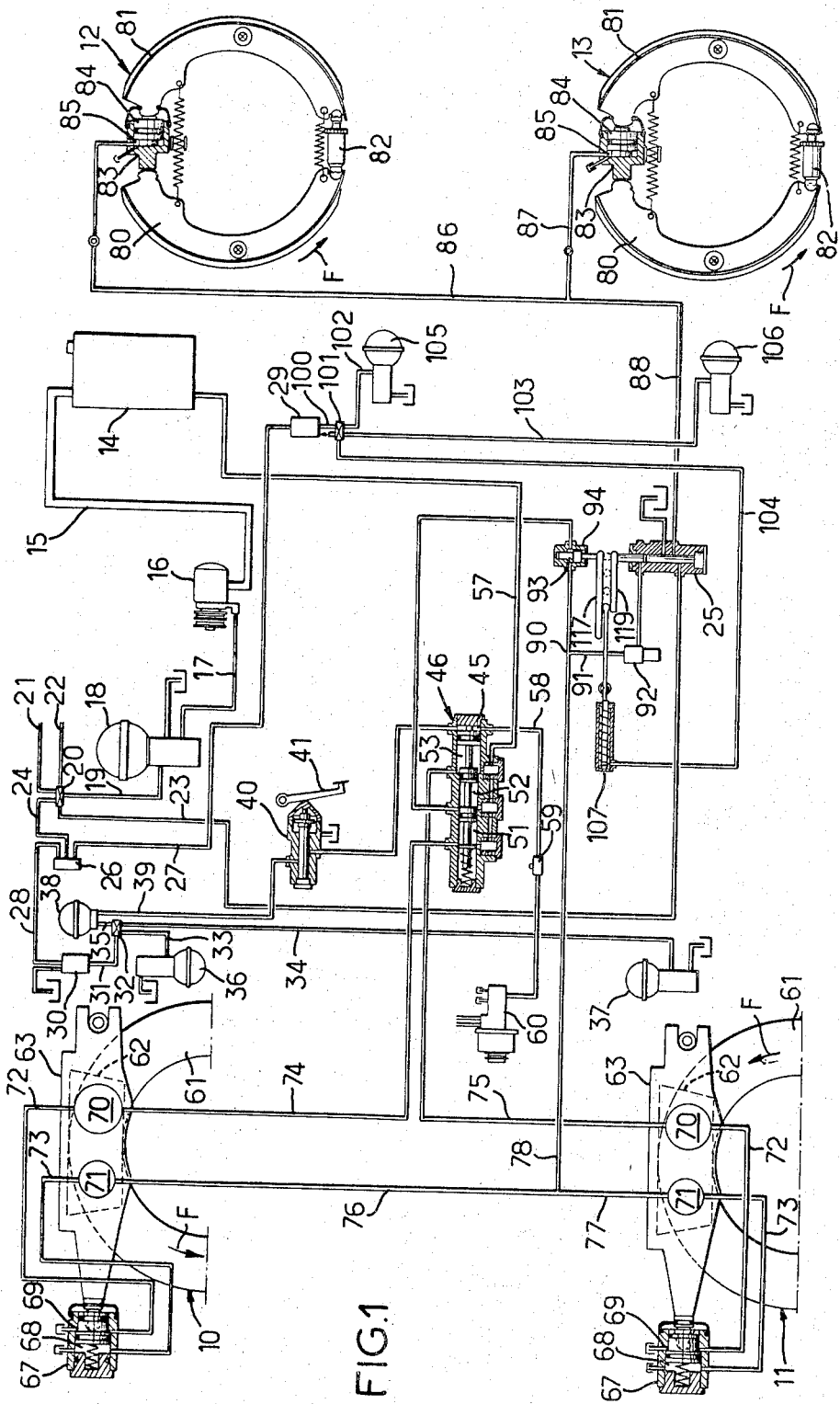
FIG. 1 is a general diagram of a braking installation for an automobile vehicle, improved in accordance with the invention.

In the form of construction shown in FIG. 1, which relates by way of example to an application of the invention to an automobile vehicle provided with two front brakes 10, 11 of the disc type, and two rear brakes 12, 14 of the drum type, a braking installation comprises a general tank 14, from which a high-pressure pump 16 takes its suction by a conduit 15. This pump supplies, through a conduit 17, a main pressure accumulator 1 which forms a coupling and decoupling device. The accumulator 18 is connected by a conduit 19 to a coupling 20 which supplies four conduits 21, 22, 23 and 24. The conduits 21 and 22 are intended to supply parts of the vehicle such as the steering device and the gear-changing device. The conduit 23 is intended to supply the rear braking circuit at the level of a rear braking corrector 25 which will be described hereinafter in more detail.

The conduit 24 supplies a pressure distributor 26, which is connected to two conduits 27 and 28. The conduit 27 is intended for the supply of a rear height-corrector 29. This latter is connected by a conduit 100 to a coupling 101 which is associated with three other conduits 102, 103 and 104. The conduit 102 is connected to the rear right-hand suspension sphere 105, while the conduit 103 is connected to a left-hand rear suspension sphere 106. The conduit 104 is coupled to a distributor cylinder 107 which will be described later in detail.

The conduit 28 supplies a front height corrector 30 which is coupled by a conduit 31 to a coupling 32 which is associated with three other conduits 33, 34 and 35. The conduit 35 is connected to a brake accumulator 38 set at a constant predetermined pressure value and connected by a conduit 39 to a brake-control 40 provided with a pedal 41.

The control 40, of a type known per se, comprises a piston assembly 42 (FIG. 3) which is actuated by the pedal 41 and which cooperates with the constant pressure conduit 39 so as to direct the fluid coming from the conduit 39 to a conduit 44 and a chamber 44a, under a pressure depending on the position of the pedal 41, and exactly proportional to the force applied to this pedal.

The conduit 43 is a return conduit to the tank, while the conduit 44 in which the pressure is increasingly high as the pedal 41 is further depressed, is connected to the pilot chamber 45 of a triple-master cylinder 46.

In the master-cylinder 46 is slidably mounted a master-piston 47 which is actuated by the pressure of the pilot chamber 45 and which comprises three pistons 48, 49 and 50, of increasing diameters. At the front of the piston 48 is formed a primary chamber 51. Between the pistons 48 and 49 is formed a secondary chamber 52. Between the pistons 49 and 50 is defined another primary chamber 53 and to the rear of the piston 50 is formed the pilot chamber 45.

The chambers 51, 52 and 53 can communicate through the intermediary of clapper-valves 54, 55 and 56 with a conduit 57 connected to the tank. The valves 54, 55 and 56 are half-open when the pilot chamber 45 is decompressed, and are intended to close as soon as the master-piston 47 is pushed in by the action of the pressure in the pilot chamber 45. The pilot chamber 45 is coupled (FIG. 1) by a conduit 58 to a slow-running corrector 59 and to a centrifugal regulator 60.

The right-hand front brake 10 (see FIGS. 1 and 2), of the disk type, comprises a disk 61 fixed for rotation with the right-hand front wheel, and is intended to be gripped between shoes 62 mounted on a tangentially movable member 63. The arrow F shows the direction of rotation of the disk 61 for forward running. The member 63 is adapted to be applied against a fixed stop 64 when the member 63 is driven tangentially in the direction opposite to the arrow F, and cooperates at its other extremity in the direction of the arrow F, with a stepped piston 65, 66 movably mounted in a cylinder 67. The piston 65, 66 comprises a large piston 65 which forms a chamber 68 in the cylinder 67, and a smaller piston 66 which forms another chamber 69 between itself and the piston 65, in the cylinder 67.

The shoes 62 are actuated for braking by means of two cylinders 70 and 71, and the cylinder 70 may be of larger diameter than the cylinder 71. The cylinder 70 is connected by a conduit 72 to the chamber 69, while the cylinder 71 is connected by a conduit 73 to the chamber 68.

The front left-hand brake 11 has a construction similar to that which has just been described for the front right-hand brake 10.

The cylinders 70 of the brakes 10 and 11 are respectively coupled by a conduit 74 and by a conduit 75 to the primary chamber 51 and to the primary chamber 53 of the master-cylinder 46. The cylinders 71 of the brakes 10 and 11 are respectively connected by conduits 76 and 77 to a common conduit 78 in turn connected to the secondary chamber 52 of the master-cylinder 46 through the intermediary of a chamber 93 formed by a cylinder 94 and a piston 95 forming part of the corrector. In addition, on the conduit 78 is connected at 90 a conduit 91 comprising a pressure-limiting or reducing device 92 having predetermined characteristics and connected to the rear braking corrector 25 (see FIG. 4).

The right-hand rear brake 12, of the drum type, comprises (see FIG. 1) two jaws 80 and 81 which are coupled by a free strap 82. The jaw 80, mounted in front of the strap 82 in the direction of forward running shown by the arrow F, is in abutment against the bottom of a cylinder 83, while the other jaw 81 is supported on a piston 84 slidably engaged in the cylinder 83. The piston 84 forms a chamber 85 in the cylinder 83.

The left-hand rear brake 13 has a construction similar to that which has just been described for the right-hand rear brake 12.

The chambers 85 of the brakes 12 and 13 are respectively connected by conduits 86 and 87 to a conduit 88 connected to the rear braking corrector 25.

The corrector 25 comprises (see FIG. 4) a cylinder 110, in which is engaged a piston 111 which forms a chamber 112 in the cylinder. This chamber is coupled to the conduit 91, to the extremity of this latter which is located downstream of the pressure-limiting or reducing device 92.

In the cylinder 110 is also engaged a piston assembly 113 which cooperates on the one hand with the conduit 23 supplied by the high-pressure source 16, 18, and on the other hand, both with a conduit 114 connected to the tank and to the conduit 88 which supplies the rear brakes 12 and 13. The piston 113 is such that it directs the fluid coming from the pressure conduit 23 towards the conduit 88 and the chamber 88a at a pressure which depends on the position of the piston 113 and which is exactly proportional to the force applied on the piston 113 by the piston 111.

The two pistons 111 and 113 are applied in abutment one with respect to the other. For this reason, the position of the piston 113 depends on that of the piston 111. The pistons 95 and 111 are respectively provided with extensions 115 and 116 which form fingers located in alignment with and opposite to each other. The finger 115 cooperates with an arm 117 pivoted at 118, while the finger 116 cooperates with an arm 119 pivoted at 120.

Between the arms 117 and 119 is inserted a roller 121 carried by an arm 122 which is coupled by an articulation 123 to a piston 124 mounted in the cylinder 107.

As the pressure increases in the conduit 104 supplying the cylinder 107, the roller 121, through the intermediary of the system 124, 123, 122, moves farther away from the pivots 118 and 120, that is to say comes closer to the fingers 115 and 116, thus modifying the step-down ratio between the movement of the piston 95 and that of the piston 111.

During the depression of the pedal 41 for the purpose of braking, the master-piston 47 moves towards the left of FIG. 1 or FIG. 3. The primary chambers 51 and 53 and the secondary chamber 52 expel respectively equivalent volumes, equal or proportional (equal in the example shown) into the conduits 74 and 75 which are connected to the cylinders 70 and into the conduit 78 which is coupled to the cylinders 71. The shoes 62 come into contact with the disc 61, which rotates in the direction of the arrow F for forward running. The member 63 leaves the stop 64 and moves forward towards the left-hand side of FIG. 2, assisted in this by the primary pressure admitted through the conduit 72 into the chamber 69. The member 63 is supported on the cushion of oil offered by the chamber 68.

A secondary pressure of high value is thus developed in the said chamber 68 and also in the conduits 73 and 76 and in the cylinder 71. This latter thus contributes to the gripping of the shoes 62 on the disc 61. The brake, which thus profits from an effect resulting from the actual rotation of the disc 61 has a certain amount of self-application.

As the cylinders 71 of the two front brakes 10 and 11 are in intercommunication with each other by means of the conduits 76 and 77 coupled to the common conduit 78, the same secondary pressure exists in the said cylinders 71, which facilitates the conditions of equilibrium between the two front brakes 10 and 11, and also in the chamber 52 of the master-cylinder, which results in a total degree of self-application of the whole which is less than that of each of the brakes individually.

If the coefficient of friction is the same for the two front brakes 10 and 11, all the forces applied are symmetrical as between the right-hand front brake 10 and the left-hand front brake 11, and the two primary pressures at 70, 70 are equal. The moving members 63, 63 occupy exactly symmetrical positions.

Figure 2:
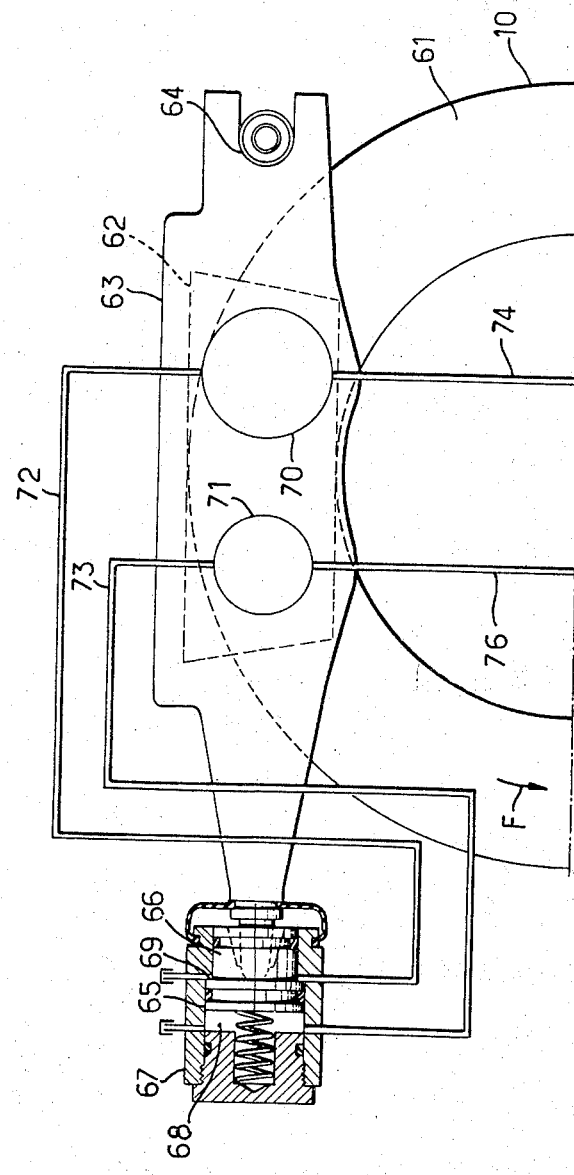
FIG. 2 is a partial view in elevation with parts in section, of the brake of the front right-hand wheel and its hydraulic supply means.

If the coefficient of friction is higher for the right-hand front brake 10 than for the left-hand front brake 11, the member 63 of the right-hand front brake 10 has a tendency to carry out a small additional movement towards the left of FIG. 1 or 2. In doing this, it tends to deliver a small quantity of oil from the chamber 68 of the right-hand front brake 10 to the chamber 68 of the left-hand front brake 11 through the intercommunicating conduits 76 and 77, which forces the member 63 of the left-hand front brake 11 to carry out the same small movement, but towards the right of FIG. 1.

During the course of these small movements, small variations of capacity appear in the primary chambers 69 of each of the two brakes 10 and 11. As the volume of oil enclosed in the primary circuits 74, 70, 72 and 75, 70, 72 is invariable, these small variations of capacity produce inverse variations of pressure, which ensures balancing of the braking. There is thus obtained a real coupling of the two front brakes 10 and 11 of the vehicle.

The rear brakes 12 and 13 are supplied by the conduit 88, the pressure of which is derived from that of the conduit 23 and is more or less high, depending on the total force applied to the piston 113.

The piston 113 is actuated by the piston 111, which is subjected on the one hand directly to the pressure of the chamber 112 which is derived from the secondary pressure in the conduit 78 according to the predetermined characteristics of the pressure-limiting or reducing device 92 and on the other hand through the intermediary of the step-down coupling rod system 117, 121, 119, to the secondary pressure of the chamber 93 through which passes the conduit 78. The rod system 117, 121, 119 introduces a ratio which depends on the position of the roller 121, that is to say on the pressure in the conduit 104. This pressure depends in turn on the load on the rear of the vehicle.

Thus, the pressure sent into the rear brakes 12 and 13 is, or other things being equal, increasingly high as the vehicle is more heavily loaded at the rear and this follows a law which follows very closely the exact load.

During the course of braking during reverse running, the secondary pressure in the circuit 78, 76, 77 only rises slightly and the primary pressures at 74 and at 75 are substantially equalized. The front brakes 10 and 11 thus have equivalent forces of application. The rear brakes 12 and 13 operate with a self-applying effect under the action of the low secondary pressure at 78 which controls their supply pressure at 88.

The distribution of the front braking and rear braking depends on the load corrector 25 as for forward running.

It should be noted that in the event of failure of one of the circuits, the safety of braking is essentially retained but the quality of braking becomes less good, thus warning the user that something is wrong and that the vehicle should be repaired.

If it is a primary circuit which is defective, the application of the corresponding front brake remains ensured by the secondary pressure cylinder 71. The other front brake and the two rear brakes function normally. The average effectiveness is practically retained, but the vehicle pulls to one side on braking, especially with high deceleration, which can be avoided by the steering control, thus giving a warning signal to the user.

If it is the secondary circuit which is defective, the braking is substantially the same but becomes less powerful due to the fact that the two rear brakes then cease to function; in this case also, the user is warned.

The invention is of course not limited to the form of construction described and shown, but includes all its alternative forms.

What I claim is:

1. A braking installation for automotive vehicles, comprising a brake disc, brake shoes engageable with the disc, primary and secondary cylinders for moving said shoes toward the disc, means for forcing hydraulic fluid into said primary and secondary cylinders to urge said shoes into braking engagement with the disc, means mounting said shoes for limited tangential movement relative to the disc, and cylinder means having a double piston movable with said mounting means upon said tangential movement thereof, said double piston defining separate primary and secondary chambers that vary inversely in volume upon movement of said double piston and that communicate separately with said primary and secondary cylinders, respectively.

2. A braking installation as claimed in claim 1, there being two said brake discs each with associated said mounting means and brake shoes and primary and secondary cylinders and double piston and primary and secondary chambers, said secondary cylinders being in fluid communication with each other whereby said mounting means associated with said two discs have different tangential movements relative to each other under the influence of pressure in their associated said secondary chambers.

3. A braking installation as claimed in claim 2, said two discs comprising the brakes of one axle of a vehicle.

4. A braking installation as claimed in claim 2, said means for forcing hydraulic fluid comprising primary and secondary pistons, and separate hydraulic circuits by which said primary and secondary pistons are connected respectively with said primary and secondary cylinders.

5. A braking installation as claimed in claim 2, said forcing means being in fluid communication with said primary and secondary cylinders at all pressure levels.

6. A braking installation for automotive vehicles, comprising a first piston for supplying braking pressure to the brakes of an automotive vehicle, a second piston, a conduit for applying to said second piston a pressure that varies as the braking force applied by the user, a pressure-reducing device communicating between said conduit and said first piston for applying to said first piston a pressure that is reduced from the pressure of said conduit, a first pivotally mounted arm bearing against said first piston, a second pivotally mounted arm bearing against said second piston, a roller disposed between and movable lengthwise of and in contact with said arms, and means responsive to the load on the vehicle to move said roller lengthwise along said arms a distance that varies as the load on the vehicle.

7. A braking installation for automotive vehicles as claimed in claim 6, and a cylinder and piston for moving said roller lengthwise of said arms, and means for supplying to said cylinder fluid under a pressure that varies as the load on the vehicle.

References Cited

UNITED STATES PATENTS

| 2,110,703 | 3/1938 | Farmer | 188—195 |
| 2,498,438 | 2/1950 | Du Rosto | 188—195 |
| 3,277,982 | 10/1966 | Kimberlin | 188—152 |
| 3,305,051 | 2/1967 | Maurice | 188—152 |
| 3,306,678 | 2/1967 | Lepelletier | 303—22 |

DUANE A. REGER, *Primary Examiner.*